United States Patent
Onaka et al.

(10) Patent No.: US 7,688,498 B2
(45) Date of Patent: Mar. 30, 2010

(54) OPTICAL AMPLIFIER AND OPTICAL MONITOR CIRCUIT

(75) Inventors: Miki Onaka, Kawasaki (JP); Etsuko Hayashi, Kawasaki (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1521 days.

(21) Appl. No.: 10/998,064

(22) Filed: Nov. 29, 2004

(65) Prior Publication Data
US 2006/0024063 A1    Feb. 2, 2006

(30) Foreign Application Priority Data
Aug. 2, 2004    (JP) .............. 2004-225131

(51) Int. Cl.
*H01S 3/00*    (2006.01)
(52) U.S. Cl. .............. 359/337; 359/337.11; 359/337.21
(58) Field of Classification Search ............... 359/333, 359/337.11, 337, 337.21
See application file for complete search history.

(56) References Cited

U.S. PATENT DOCUMENTS

| | | | |
|---|---|---|---|
| 5,061,032 A | 10/1991 | Meltz et al. | |
| 5,982,962 A | 11/1999 | Koops et al. | |
| 6,002,822 A * | 12/1999 | Strasser et al. | 385/48 |
| 6,049,413 A * | 4/2000 | Taylor et al. | 359/337 |
| 6,151,158 A | 11/2000 | Takeda et al. | |
| 6,337,939 B1 * | 1/2002 | Aspell et al. | 385/37 |
| 6,359,726 B1 | 3/2002 | Onaka et al. | |
| 2004/0056183 A1 | 3/2004 | Eggleton et al. | |

FOREIGN PATENT DOCUMENTS

| | | |
|---|---|---|
| EP | 0 594 178 A | 4/1994 |
| EP | 0 840 150 A | 5/1998 |
| EP | 1 033 834 A | 9/2000 |

(Continued)

OTHER PUBLICATIONS

European Search Report for European Patent Application 04028247.4-1246 mailed on Jan. 14, 2008.

(Continued)

*Primary Examiner*—Mark Hellner
(74) *Attorney, Agent, or Firm*—Staas & Halsey LLP

(57) ABSTRACT

An optical amplifier of the present invention comprises: an optical amplifying circuit which amplifies a signal light; an optical reflection medium which is disposed on an optical fiber connected to the optical amplifying circuit and is capable of reflecting a noise light which exists in a predetermined wavelength range outside a signal band, among noise lights generated in said optical amplifying circuit, to radiate the reflected noise light to the outside of a core of the optical fiber; a light receiver which receives the noise light reflected to be radiated to the outside of the core of the optical fiber by the optical reflection medium, to detect the power of the noise light; and a computation circuit which computes the total power of the noise lights generated in the optical amplifying circuit based on the detection result of the light receiver. Thus, it is possible to provide at a low cost an optical amplifier provided with a monitoring function capable of detecting high accurately, with a simple optical circuit configuration, the noise light power and the like generated when the signal light is amplified.

17 Claims, 7 Drawing Sheets

FOREIGN PATENT DOCUMENTS

| | | |
|---|---|---|
| JP | 07-240717 | 9/1995 |
| JP | 08-330649 | 12/1996 |
| JP | 10-013345 | 1/1998 |
| JP | 11-068203 | 3/1999 |
| JP | 2000-252923 | 9/2000 |
| JP | 2001-168841 | 6/2001 |
| JP | 2001-516468 | 9/2001 |
| JP | 2003-086875 | 3/2003 |

OTHER PUBLICATIONS

European Search Report for European Patent Application 04028247.7-1246 mailed on Jan. 14, 2008.

Office Action issued by the Japanese Patent Office on Apr. 15, 2008 for corresponding Japanese Application 2004-225131.

C.K. Madsen, et al., "Planar Waveguide Optical Spectrum Analyzer Using a UV-Induced Grating", ECOC, vol. 4, No. 6, (pp. 925-929) 1998.

Jefferson L. Wagener, et al., "Fiber Grating Optical Spectrum Analyzer Tap", ECOC, (pp. 65-68) 1997.

Tetsuro Komukai, et al., "Recent Progress in Optical Fiber Bragg Gratings", Technical Report of IEICE, OPE 95-114 (Dec. 1995) (pp. 19-24).

A. Niwa, et al., "Gain Equalizer Using Slanted Fiber Bragg Gratings", Fujikura Technical Report, Oct. 2002, (pp. 1-4).

Osamu Hanaizumi, et al., "Optical Devices With Wavelength-Selectivity Using Multi-Dimensional Periodic Structures", Opened Sympodium, Lectures (pp. 85-88), Jan. 2004.

C.K. Madsen, et al. "Planar Waveguide Optical Spectrum Analyzer Using a UV-Induced Grating" IEEE Journal of Selected Topics in Quantum Electronics, vol. 4, No. 6, Nov./Dec. 1998.

Jefferson L. Wagener, et al. "Fiber Grating Optical Spectrum Analyzer Tap" ECOC, 1997, pp. 65-68, postdeadline paper vol. 5, 1997.

Tetsuro Komukai, et al. "Recent Progress in Optical Fiber Bragg Gratings" Technical Report of IEICE, OPE 95-114 (Dec. 1995).

A. Niwa, et al. "Gain Equalizer Using Slanted Fiber Bragg Gratings" Fujikura Technical Report, Oct. 2002.

Osamu Hanaizumi, et al. "Optical devices with wavelength-selectivity using multi-dimensional periodic structures" Opened sympodium, lectures pp. 85-88, Jan. 21-22, 2004.

* cited by examiner

OPTICAL AMPLIFIER AND OPTICAL MONITOR CIRCUIT

BACKGROUND OF THE INVENTION

1. Field of the Invention

The present invention relates to an optical amplifier and an optical monitor circuit, which are mainly utilized for optical communications, and in particular, relates to an optical amplifier and an optical monitor circuit, which are provided with a monitoring function of detecting the power of noise light and the like generated when a signal light is amplified.

2. Description of the Related Art

An optical amplifier is one of key components for realizing the long distance and large capacity of an optical communication system. Optical amplifiers are classified into a laser amplifier using the stimulated emission from a population inversion medium and an amplifier based on a non-linear optical effect such as Raman scattering, Brillouin scattering or the like. Further, the laser amplifier includes a rare-earth element doped fiber amplifier and a semiconductor laser amplifier using a semiconductor amplification medium. The former is operated as an optical amplifier with the optical pumping, and the latter is operated as an optical amplifier with the injected current pumping. In these optical amplifiers, the rare-earth element doped optical fiber amplifier has a large advantage in terms of performance, for example, bit rate free, high gain, low noise, broadband, low coupling loss, low polarization dependence, high efficiency and the like. In the rare-earth element doped optical fiber amplifiers, an erbium (Er)-doped fiber amplifier (to be referred to as EDFA hereunder) is typical and is now in practical use in an optical fiber communication system. Such an optical amplifier is required to realize the higher performance while holding a simple optical circuit configuration, in order to achieve the improvement of the performance, the cost performance and the like of the optical communication system to which such an optical amplifier is applied. Therefore, demands for an optical amplifier realizing the higher performance are increased.

In a WDM optical communication system which repeatedly transmits a wavelength division multiplexed (WDM) light containing a plurality of optical signals of different wavelengths, it is desired that a wavelength characteristic of the signal light power is flat in order to satisfy a predetermined transmission characteristic. However, there is a problem in that the wavelength flatness of the signal light power on the reception side is deteriorated due to various factors, such as conditions of optical transmission path, the accumulation of gain wavelength characteristic (for example, tilt, ripple or the like) in an optical amplification repeating station using the rare-earth element doped optical fiber amplifier, the Raman amplifier and the like. Therefore, as one issue concerning an optical amplifier operation control, there is considered the establishment of technology for controlling an output wavelength characteristic of the optical amplification repeating station (first issue).

Further, in the optical amplifier, an amplified spontaneous emission (ASE) light being a noise component is generated with the optical amplification. This ASE light is generated over a broad wavelength band, although the optical power level thereof is significantly low compared with that of the signal light. Therefore, in the case of performing a control of the optical amplifier, such as an automatic level control or an automatic gain control, using a typical output monitoring technology in which an output light from the optical amplifier is branched to be received by a light receiver, since the optical power of the ASE light being the noise component is contained together with the signal light in the output light, an influence of the ASE light is reflected in the output monitoring result, thereby deteriorating the control accuracy of the optical amplifier. Moreover, an input shutdown function (function of detecting no-input of the input signal light power to shut off the pumping light power for the optical amplifier) of the optical amplifier arranged on the downstream is also deteriorated. Such a problem caused by the ASE light becomes serious, since a generation amount of the ASE light is significantly changed, particularly in a system or the like where the number of signal wavelengths is dynamically changed. Therefore, as another issue concerning the optical amplifier operation control, there is considered the establishment of technology for monitoring the ASE power generated with an optical amplifier correctly, and for correcting a control target value and a no-input detection threshold of the optical amplifier (second issue).

Moreover, in the optical amplifier, there is a problem in that, in a high population inversion state, energy concentrates in a wavelength range having a larger gain coefficient to cause an oscillating operation, and accordingly, the noise component is increased to deteriorate a transmission characteristic. This oscillation phenomenon of the optical amplifier includes a threshold according to a relationship between a gain of an optical amplification medium and reflection attenuation amounts on the input and output sides of the optical amplification medium, and therefore, the problem as described above is exposed due to factors, such as gain conditions of the optical amplifier, the deterioration of reflection attenuation amounts in optical components. To be specific, for example, in the case where the number of signals input to the optical amplifier is less or in the case where an isolation amount in an optical isolator on an optical path connected to the optical amplification medium is deteriorated, the oscillating operation (increase of noise component) becomes apparent. Therefore, as a further issue concerning the optical amplifier operation control, there is considered the establishment of control technology in which the output light level does not exceed an oscillation threshold in a previously known wavelength range of large gain coefficient (third issue).

In order to achieve the improvement of the performance and reliability of the WDM optical communication system, it is important to solve simultaneously the above described first to third issues concerning the optical amplifier operation control. To be specific, it is necessary to enable the monitoring with high accuracy of a wavelength characteristic of the WDM signal light power for the first issue, and to enable the monitoring with high accuracy of the power of the noise light, such as the ASE light and the like, for the second and third issues.

As a configuration of an optical power monitor in the conventional optical amplifier, as shown in FIG. 12 for example, there has been known a configuration in which an optical branching device 101 is inserted on a main signal system optical path through which a WDM light is propagated, and an optical spectrum analyzer (OSA) 102 is arranged on a branching port of the optical branching device 101, so that a measurement result of the optical spectrum monitored by the optical spectrum analyzer 102 is transmitted to a variable gain equalizer (VGEQ) 103 and the like, thereby performing the control. Further, there is also a configuration in which, instead of the optical spectrum analyzer 102, a wavelength separating device (for example, grating, optical filter or the like) and a light receiver are disposed on the branching port of the optical branching device 101, so that a light demultiplexed by the wavelength separating device is received by the light receiver to monitor the power thereof (Japanese Unexamined Patent Publication No. 2001-168841).

However, in the configuration of the conventional optical power monitor, it is necessary to newly add the optical branching device 101 and the expensive optical spectrum analyzer 102 or the wavelength separating device and the like to the optical amplifier. Therefore, there is a disadvantage of the complication and high cost of the optical circuit configuration.

Further, as exemplarily shown in the lower left of FIG. 12, the noise light, such as the ASE light or the like, whose optical power per unit micro-wavelength range is significantly low compared with that of the signal light, is branched at a branching ratio same as the signal light by the optical branching device 101. The branching ratio by the optical branching device 101 is set so that a ratio of the monitor light side becomes lower, since a decrease of the main signal light power needs to be suppressed as much as possible (for example, 95 to 99% on the main signal light side while 1 to 50% on the monitor light side, or the like). Therefore, the noise light contained in the monitor light becomes very little, so that the level of the noise light received by the optical spectrum analyzer 102 is low. Accordingly, there is also a problem in that the photosensitivity is poor and it becomes hard to monitor with desired accuracy the noise light power.

As one method for solving the problems in the conventional configuration as described above, there is considered that, for example, a typical value of the power of the noise light generated in the optical amplifier is previously obtained by an experiment, the simulation or the like, to perform the control of the optical amplifier using the obtained typical value. However, according to such a method, it is hard to estimate accurately the value of the power of the noise light generated in the optical amplifier, since the generation amount of the noise light is dynamically changed according to individual differences in components of the optical amplification medium, a change in environment (for example, temperature, humidity or the like), the number of wavelengths of the signal light contained in the WDM light or the like. Therefore, it becomes impossible to correct accurately the noise light component in the actually monitored optical output power. Consequently, the control accuracy of the optical amplifier becomes poor, thereby deteriorating the performance and reliability of the WDM optical communication system.

SUMMARY OF THE INVENTION

The present invention has been accomplished in view of the above problems, and has an object to provide at a low cost an optical amplifier and an optical monitor circuit, which are provided with a monitoring function capable of detecting with high accuracy the noise light power, the signal light power and the like, generated when a signal light is amplified, using a simple circuit configuration.

In order to achieve the above object, an optical amplifier according to the present invention comprises: an optical amplification section that amplifies a signal light; an optical reflection medium which is disposed on an optical fiber connected to the optical amplification section and is capable of reflecting a noise light which exists in a predetermined wavelength range outside a signal band, among noise lights generated in the optical amplification section, to radiate the reflected noise light to the outside of a core of the optical fiber; a light receiving section that receives the noise light reflected to be radiated to the outside of the core of the optical fiber by the optical reflection medium, to detect the power of the noise light; and a computation section that computes the total power of the noise lights generated in the optical amplification section based on the detection result of the light receiving section.

According to the optical amplifier of such a configuration, a light which is output from the optical amplification section and is propagated through the optical fiber is given to the optical reflection medium. In this optical reflection medium, among the noise lights in a broad wavelength band generated in the optical amplification section, the noise light which exists in the predetermined wavelength range outside the signal band is selectively reflected to be radiated to the outside of the core of the optical fiber. The noise light radiated to the outside of the core of the optical fiber is received by the light receiving section, where the power of the noise light is detected and the detection result is transmitted to the computation section. In the computation section, based on the detection result in the light receiving section, the total power of the noise lights generated in the optical amplification section is computed.

Further, when the above optical amplifier includes an optical filter device which transmits the signal light in accordance with a previously set transmission wavelength characteristic, on the optical fiber connected to the optical amplification section, the optical filter device is provided with a function as the optical reflection medium. Thus, it becomes possible to monitor the power of the noise light utilizing the existing optical filter device, without the necessity of separately adding a device for noise light monitoring.

Moreover, as one aspect of the above optical amplifier, the configuration may be such that the optical amplification section amplifies a wavelength division multiplexed light containing a plurality of signal lights of different wavelengths, and there is used, as the optical filter device, a gain equalization optical filter having a transmission wavelength characteristic capable of flattening a gain wavelength characteristic of the optical amplification section in a signal band of the wavelength division multiplexed light, and also a reflection characteristic capable of reflecting the noise light existing in the predetermined wavelength range outside the signal band to radiate the reflected noise light to the outside of the core of the optical fiber. According to such a configuration, the noise light is monitored utilizing the gain equalization optical filter provided in a typical optical amplifier.

Furthermore, the above optical amplifier may be provided with a control section that corrects the noise light power contained in the optical output power from the optical amplification section based on the total power of the noise lights computed in the computation section to calculate the optical output power of only a signal light component, thereby controlling the optical amplification section according to the calculation result. According to such a configuration, it becomes possible to control the optical amplifier without a substantial influence of the noise light.

An optical monitor circuit according to the present invention comprises: an optical reflection medium formed on an optical fiber through which a plurality of lights of different wavelengths is propagated, including a diffraction grating in which a normal direction of a grating plane is arranged to be tilted to an axial direction of the optical fiber and a reflection characteristic thereof is designed so that the reflectance to the light in a first wavelength band and the reflectance to the light in a second wavelength band different from the first wavelength band are different from each other, among the lights propagated through the optical fiber, and being capable of radiating the reflected lights to the outside of the core of the optical fiber; a first light receiving section that receives the light in the first wavelength band reflected to be radiated to the outside of the core of the optical fiber by the optical reflection medium, to detect the power of the radiated light; and a second light receiving section that receives the light in the second wavelength band reflected to be radiated to the outside of the core of the optical fiber by the optical reflection medium, to detect the power of the radiated light. Further, the optical monitor circuit may be configured such that the lights propagated through the optical fiber contains a signal light in the first wavelength band and only a noise light exists in the second wavelength band, and in the optical reflection medium, the reflection characteristic of the diffraction grating is designed so that the reflectance to the noise light in the second wavelength band is higher than the reflectance to the light in the first wavelength band.

According to such an optical monitor circuit, even in the case where the power of the light in the first wavelength band and the power of the light in the second wavelength band are significantly different from each other as in the power of the signal light and the power of the noise light, by selectively reflecting the light in the low power band at the high reflectance, it becomes possible to monitor the power of such a light with high accuracy.

Other objects, features and advantages of the present invention will become apparent from the following explanation of the embodiments, in conjunction with the appended drawings.

DESCRIPTION OF THE PREFERRED EMBODIMENTS

Figure 1:
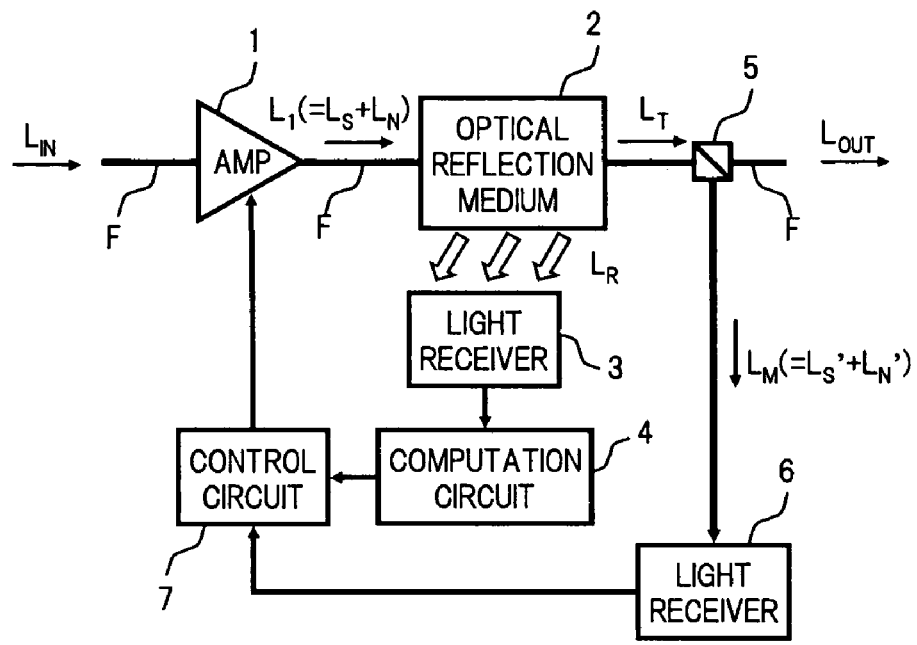
FIG. 1 is a block diagram showing a configuration of an optical amplifier according to a first embodiment of the present invention.

There will be described embodiments for implementing the present invention, with reference to the accompanying drawings. The same reference numerals denote the same or equivalent parts in all drawings.

FIG. 1 is a block diagram showing a configuration of an optical amplifier according to a first embodiment of the present invention.

In FIG. 1, the optical amplifier in the first embodiment comprises, for example, an optical amplifying circuit 1 as an optical amplification section that amplifies an input signal light $L_{IN}$, an optical reflection medium 2 formed on an optical fiber F connected to the optical amplifying circuit 1, a light receiver 3 as a light receiving section that receives a light reflected to be radiated to the outside of a core of the optical fiber F by the optical reflection medium 2, to detect the power of the radiated light, and a computation circuit 4 as a computation section that computes the total power of a noise light generated in the optical amplifying circuit 1, based on the detection result in the light receiver 3. Further, this optical amplifier includes an optical branching device 5 which branches a part of a light output from the optical amplifying circuit 1 to be propagated through the optical fiber F, a light receiver 6 which receives the light branched by the optical branching device 5 to detect the power of the branched light, and a control circuit 7 which controls the optical amplifying circuit 1 according to output signals from the computation circuit 4 and the light receiver 6.

Figure 2:
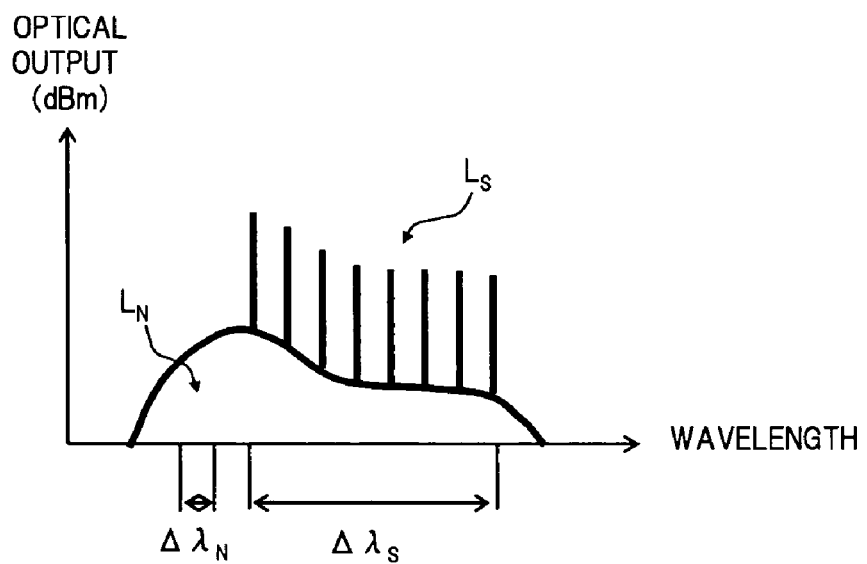
FIG. 2 is a diagram showing one example of a wavelength characteristic of light output from an optical amplifying circuit in the first embodiment.

The optical amplifying circuit 1 is configured by using a known optical amplifier, for example, a rare-earth element doped optical fiber amplifier, a Raman amplifier, a semiconductor optical amplifier or the like, and amplifies the signal light $L_{IN}$ input via the optical fiber F up to a required level, to output the amplified light to the optical fiber F. In this optical amplifying circuit 1, when the input signal light $L_{IN}$ is amplified, a noise light, such as an amplified spontaneous emission (ASE) light or the like, is generated. Therefore, as shown in FIG. 2 for example, an output light $L_1$ containing an amplified signal light $L_S$ and a noise light $L_N$ is output to the optical fiber F from the optical amplifying circuit 1. Note, one example is shown in which a WDM light containing a plurality of signal lights of different wavelengths is amplified in the optical amplifying circuit 1. However, the present invention is also available in the case where a signal light of single wavelength is amplified in the optical amplifying circuit 1.

Figure 3:
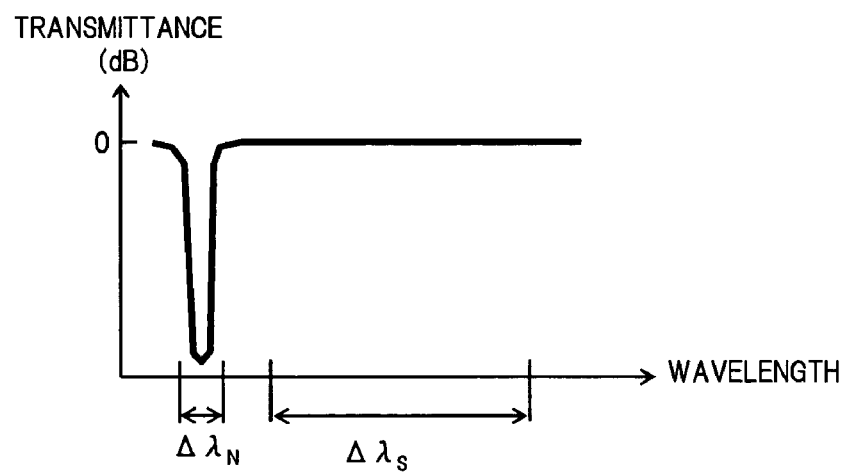
FIG. 3 is a diagram showing one example of a transmission wavelength characteristic of an optical reflection medium used in the first embodiment.

The optical reflection medium 2 has a structure capable of reflecting a noise light (refer to FIG. 2) which exists in a predetermined wavelength range $\Delta\lambda_N$ outside a signal band $\Delta\lambda_S$, among the noise light $L_N$, such as the ASE light or the like, generated in the optical amplifying circuit 1, in accordance with the predetermined reflectance, to radiate the reflected light to the outside of the core of the optical fiber F, and transmitting therethrough the light outside the wavelength range $\Delta\lambda_N$. FIG. 3 shows one example of a transmission wavelength characteristic of the optical reflection medium 2. As specific examples of the optical reflection medium 2, there are a fiber grating, a photonic crystal, an induced multi-layer, a Mach-Zehnder type device and the like. Note, a preferable constitutional example of the optical reflection medium 2 will be described in detail in another embodiment to be described later.

The light receiver 3 is disposed on a position at which a noise light $L_R$ reflected to be radiated to the outside of the core of the optical fiber F by the optical reflection medium 2 can be received, and outputs an electric signal whose level is changed according to the power of the noise light $L_R$, to the computation circuit 4.

The computation circuit 4 computes the total power of the noise light $L_N$ generated over a broad wavelength band in the optical amplifying circuit 1, based on the power of the noise light $L_R$ indicated by the output signal from the light receiver 3 and the reflectance to the wavelength range $\Delta\lambda_N$ of the optical reflection medium 2, to output a signal indicating the computation result to the control circuit 7. The above computation process is performed by, for example, referring to a table in which a relationship between the noise light power in the wavelength range $\Delta\lambda_N$ monitored by the light receiver 3 and the total power of the noise light $L_N$ generated in the optical amplifying circuit 1 is previously obtained by an experiment, the simulation or the like. Further, in order that this table has the excellent reliability, it is desirable that a band of high gain coefficient in the optical amplifying circuit 1 is selected in the setting of the wavelength range $\Delta\lambda_N$. As a specific example, it is preferable to select the vicinity of 1.53 μm band as the wavelength range $\Delta\lambda_N$ in the case where an erbium doped optical fiber amplifier (EDFA) is used for the optical amplifying circuit 1 and the signal band $\Delta\lambda_S$ is the C-band (1.55 μm band). Further, it is preferable to select the vicinity of 1.57 μm band as the wavelength range $\Delta\lambda_N$ in the case where the signal band $\Delta\lambda_S$ is the L-band (1.58 μm band).

Figure 12:
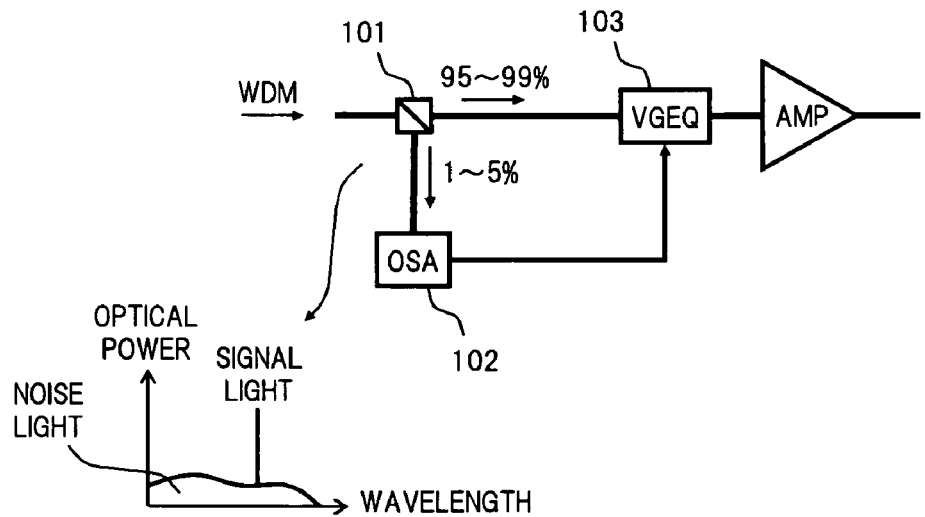
FIG. 12 is a diagram showing a configuration example of an optical power monitor in a conventional optical amplifier.

Here, the optical branching device 5 is disposed on the optical fiber F on the latter stage of the optical reflection medium 2, for example, and branches the light $L_T$ transmitted through the optical reflection medium 2 into two in accordance with a previously set branching ratio, to output one branched light to the outside of the optical amplifier as an output light $L_{OUT}$ while outputting the other branched light to the light receiver 6 as a monitor light $L_M$. In this optical branching device 5 as well as an optical branching device 101 in a conventional configuration shown in FIG. 12, a ratio on the monitor light side is set to be lower, in order to suppress a decrease of the power of main signal light. The monitor light $L_M$ branched by the optical branching device 5 contains a signal light $L_S'$ and a noise light $L_N'$ which are branched at the same branching ratio.

The light receiver 6 receives the monitor light $L_M$ from the optical branching device 5, to output an electric signal whose level is changed according to the power of the monitor light $L_M$ to the control circuit 7.

The control circuit 7 receives the output signal from the light receiver 6 to obtain the total power of the output light $L_{OUT}$, and thereafter, performs the correction on a noise component using the total power of the noise light $L_N$ indicated by the output signal from the computation circuit 4, to calculate the output power of only the signal light, thereby controlling an operation of the optical amplifying circuit 1 according to the calculation result.

In the optical amplifier of the above described configuration, in addition to the total output power (signal light+noise light) monitored by the optical branching device 5 and the light receiver 6 which are already provided in a typical optical amplifier, the total power of the noise light $L_N$ generated in the optical amplifying circuit 1 is monitored by the optical reflection medium 2, the light receiver 3 and the computation circuit 4. Therefore, by correcting the total output power using the total power of the noise light $L_N$, it becomes possible to monitor with high accuracy the output power of only the signal light. Thus, by performing a control (for example, an automatic level control, an automatic gain control or the like) of the optical amplifying circuit 1 utilizing the output power of only the signal light, it becomes possible to stably perform the amplification of the signal light with high accuracy.

Further, since the optical reflection medium 2 formed on the optical fiber F for monitoring the total power of the noise light $L_N$ is for adding a reflection characteristic outside the signal band, the primary performance of the optical amplifier (for example, a gain, noise figure (NF) and the like) is not deteriorated. Accordingly, a reflection amount to the noise light in the wavelength range $\Delta\lambda_N$ in the optical reflection medium 2 can be arbitrarily set according to the photosensitivity of the light receiver 3. To be specific, the reflection characteristic of the optical reflection medium 2 may be set so that the power of the noise light reflected by the optical reflection medium 2 converges into a light receiving level range (for example, −30 to 0 dBm/ch) where the excellent photosensitivity can be obtained in the light receiver 3. Thus, it becomes possible to solve at a low cost, by the addition of a simple optical circuit configuration, a problem in that the noise light power cannot be monitored with sufficient accuracy, since the noise light is branched at a branching ratio same as the signal light in the optical branching device, as in the conventional technology.

Moreover, in an optical communication system configured using a plurality of optical amplifiers in the present embodiment, it is also possible that the total power of the noise light $L_N$ computed by the computation circuit 4 of the optical amplifier arranged on the upstream is transmitted to the optical amplifier arranged on the downstream, to perform the noise light correction in a no-signal light input detection in the downstream side optical amplifier. To be specific, in the downstream side optical amplifier, for example, it is possible that the total power of the noise light $L_N$ transmitted from the upstream side optical amplifier is subtracted from the total output light power to calculate the optical power of only the signal light, and the no-input of the signal light is detected based on the calculation result. Thus, an input shutdown control in the downstream side optical amplifier is reliably performed without a substantial influence of the noise light generated in the upstream side optical amplifier.

In addition, it is also possible to perform a control for avoiding an oscillation operation of the optical amplifier utilizing the noise light power in the wavelength range $\Delta\lambda_N$ monitored by the light receiver 3. Namely, if the wavelength range $\Delta\lambda_N$ is set in the vicinity of a peak wavelength of the gain coefficient in the optical amplifying circuit 1, it becomes possible to prevent from occurring an oscillation phenomenon, by monitoring the noise light power in the wavelength range $\Delta\lambda_N$ to control an amplification operation of the optical amplifying circuit 1 so that the monitored value does not exceed a previously set oscillation threshold.

Next, a second embodiment of the present invention will be described.

Figure 4:
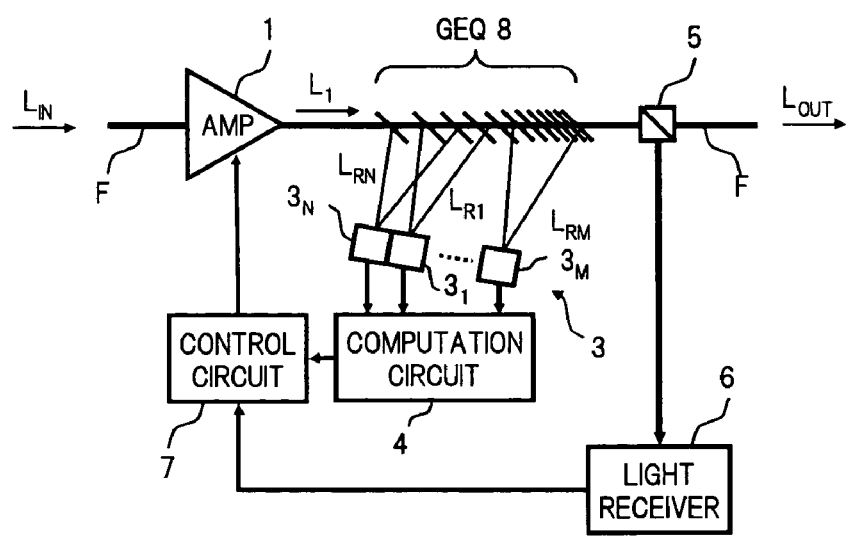
FIG. 4 is a block diagram showing a configuration of an optical amplifier according to a second embodiment of the present invention.

FIG. 4 is a block diagram showing a configuration of an optical amplifier in the second embodiment. The feature of the optical amplifier in the second embodiment is that a gain equalization optical filter (GEQ) 8 typically provided in a known optical amplifier which collectively amplifies the WDM light also includes a function as the optical reflection medium 2 in the above first embodiment.

The GEQ 8 is a fiber grating configured by combining a tilted configuration in which a Bragg diffraction grating is formed to be tilted to an axial direction of the optical fiber F and a chirped configuration in which grating spacing of the Bragg diffraction grating is gradually changed along the axial direction of the optical fiber F (to be referred to as a tilted and chirped FBG hereunder). This tilted and chirped FBG is designed to have a transmission wavelength characteristic capable of flattening a gain wavelength characteristic of the optical amplifying circuit 1 with respect to the signal band $\Delta\lambda_S$, and also a characteristic capable of reflecting the noise light $L_N$ existing in the wavelength range $\Delta\lambda_N$ outside the signal band to radiate the reflected noise light to the outside of the core of the optical fiber F Note, in the tilted and chirped FBG, a part of the light in the signal band $\Delta\lambda_S$ is also radiated to the outside of the core of the optical fiber F.

Figure 5:
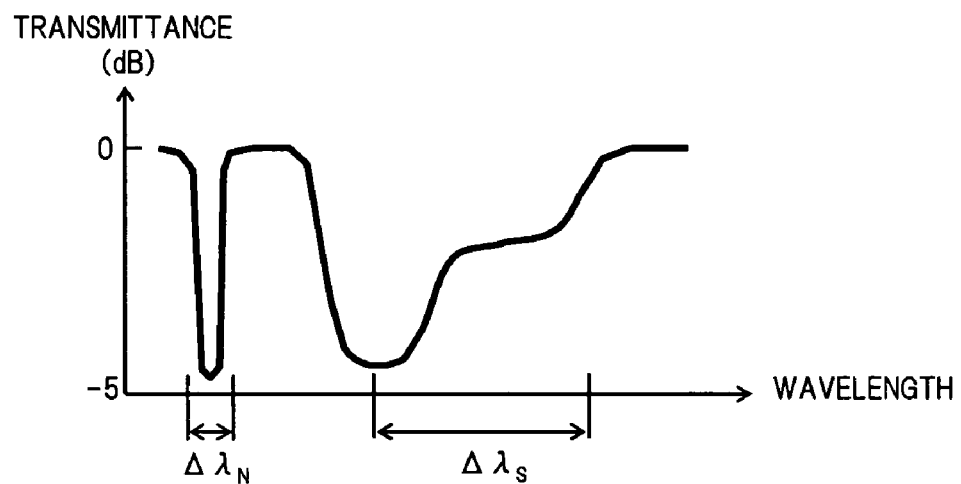
FIG. 5 is a diagram showing one example of a transmission wavelength characteristic of a GEQ used in the second embodiment.
Figure 6:
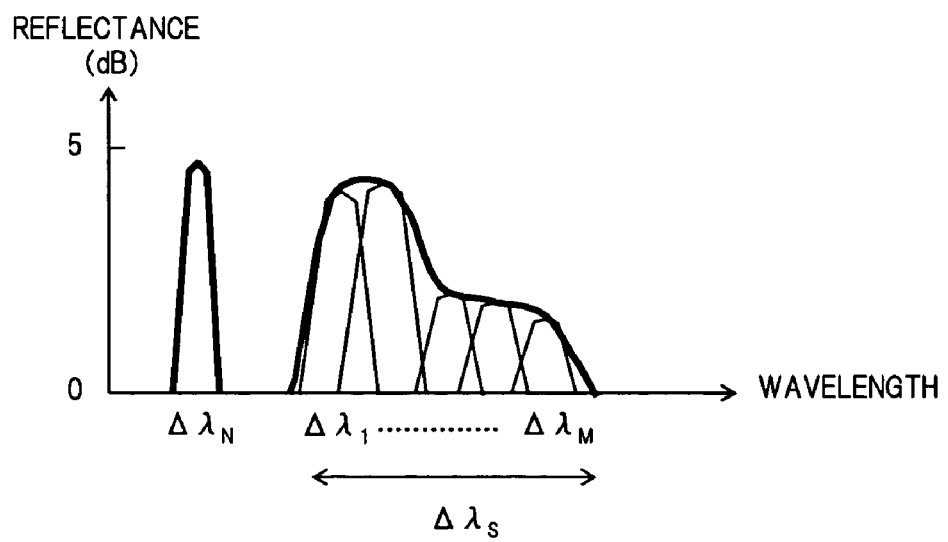
FIG. 6 is a diagram showing one example of a reflection wavelength characteristic of the GEQ used in the second embodiment.

FIG. 5 and FIG. 6 are diagrams showing, respectively, one example of the transmission wavelength characteristic and one example of the reflection wavelength characteristic of the GEQ 8 using the tilted and chirped FBG. As shown in each figure, the transmittance of the light in the signal band $\Delta\lambda_S$ is designed to have the wavelength dependence opposite to the gain wavelength characteristic of the optical amplifying circuit 1 (refer to FIG. 2), and a reflection amount of the light in the signal band $\Delta\lambda_S$ which is radiated to the outside of the core of the optical fiber F is changed corresponding to the transmission wavelength characteristic in the signal band $\Delta\lambda_S$. Further, the reflectance of the wavelength range $\Delta\lambda_N$ outside the signal band is designed to be higher than the averaged reflectance of the signal band $\Delta\lambda_S$, so that even the noise light whose optical power per unit micro-wavelength range is significantly low compared with that of the signal light can be reliably monitored by the light receiver 3.

A light receiver $3_N$ is for receiving a noise light $L_{RN}$ in the wavelength range $\Delta\lambda_N$, which is reflected to be radiated to the outside of the core of the optical fiber F by the GEQ 8, to measure the power of the noise light $L_{RN}$, and is arranged on a position according to a focal point of the noise light $L_{RN}$. Further, light receivers $3_1$ to $3_M$ are for receiving lights $L_{R1}$ to $L_{RM}$ corresponding to the respective signal light wavelengths, which are reflected to be radiated to the outside of the core of the optical fiber F by the GEQ 8, to measure the power of each of the lights $L_{R1}$ to $L_{RM}$, and are arranged on positions according to focal points of the respective lights $L_{R1}$ to $L_{RM}$. Note, the respective wavelength bands shown by narrow lines in FIG. 6 conceptually indicate light receiving ranges by the respective light receivers $3_N$, and $3_1$ to $3_M$.

The computation circuit 4 computes the total power of the noise light $L_N$ generated in the optical amplifying circuit 1, based on the power of the noise light $L_{RN}$ in the wavelength range $\Delta\lambda_N$, which is measured by the light receiver $3_N$, and the reflection characteristic of the GEQ 8, as in the same manner as in the above first embodiment. Further, the computation circuit 4 obtains a wavelength characteristic of the output light $L_{OUT}$ output from the present optical amplifier, and further computes the total output power (signal light+noise light), based on the power of each of the lights $L_{R1}$ to $L_{RM}$ corresponding to the respective signal light wavelengths measured by the light receivers $3_1$ to $3_M$ and the reflection characteristic of the GEQ 8. The computation result of the computation circuit 4 is transmitted to the control circuit 7. In the control circuit 7, as in the same manner as in the first embodiment, the total output power is corrected using the total power of the noise light $L_N$, to obtain the output power of only the signal light, so that the control of the optical amplifying circuit 1 is performed.

Here, the tilted and chirped FBG applied to the GEQ 8 will be described in detail.

At first, typically, a fiber grating is configured such that a Bragg diffraction grating is formed on an optical fiber using a change in refractive index due to ultraviolet light induction of a core of the optical fiber, and functions as a reflection filter which reflects (or shuts off) only a light of Bragg wavelength.

Further, in the fiber grating, by forming a grating of several tens of thousands of layers in a longitudinal direction of the optical fiber, it is possible to realize a sharp spectral characteristic in which the reflectance (or the transmittance) to the wavelength is abruptly changed.

To be specific, a Bragg reflective wavelength $\lambda_B$ of the fiber grating is represented by the next equation (1) using the actual refractive index n to a propagation mode of the optical fiber and the grating spacing (grating pitch) P.

$$\lambda_B = 2nP \qquad (1)$$

Further the band width $\Delta\lambda_B$ of reflectance spectrum is represented by the equation (2) using the grating length L and the amplitude $\Delta n$ of refractive index modulation.

$$\Delta\lambda_B = \{\lambda_B{}^2/(\pi nL)\} \times \{\pi^2 + (\pi\Delta nL/\lambda_B)^2\}^{1/2} \qquad (2)$$

Moreover, the grating reflectance $R_B$ is represented by the equation (3) using a ratio $\gamma$ of propagated optical energy contained in a core region.

$$R_B = \tan h^2(\pi L \Delta n \gamma/\lambda_B) \qquad (3)$$

In addition, in the fiber grating, not only a light of specific wavelength can be reflected to an incident direction but also a reflected light can be radiated to a clad region by preparing the grating to be tilted to the axial direction of the optical fiber, and the light coupled to this backward cladding mode is emitted to the outside of the optical fiber. Therefore, application examples of the fiber grating to an optical spectrum monitor, a gain equalizer and the like have been reported (refer to a literature 1: "Planar Waveguide Optical Spectrum Analyzer Using a UV-Induced Grating" by C. K. Madsen et al., IEEE Journal of Selected Topics in Quantum Electronics, Vol. 4, No. 6, November/December 1998, 925-929, a literature 2: "Fiber Grating Optical Spectrum Analyzer Tap" by Jefferson L. Wagener et al., ECOC, 1997, 65-68, postdeadline paper V. 5, and a literature 3: "Recent Progress in Optical Fiber Bragg Gratings" by Tetsuro Komukai et al., Technical Report of IEICE OPE95-114 (1995-12)).

A reflective wavelength $\lambda_B'$ in the vacuum of such a tilted FBG is shifted to the shorter wavelength side by a difference of cladding mode effective refractive index compared with the Bragg reflective wavelength $\lambda_B$ represented in the above equation (1) (in the case where the grating direction is perpendicular to the axial direction of the optical fiber), and therefore, is represented by the next equation (4) using the effective refractive index $n_{core}$ of the core and effective refractive index $n_{clad}$ of the clad of the optical fiber.

$$\lambda_B' = P(2n_{core} - n_{clad}) \qquad (4)$$

Figure 7:
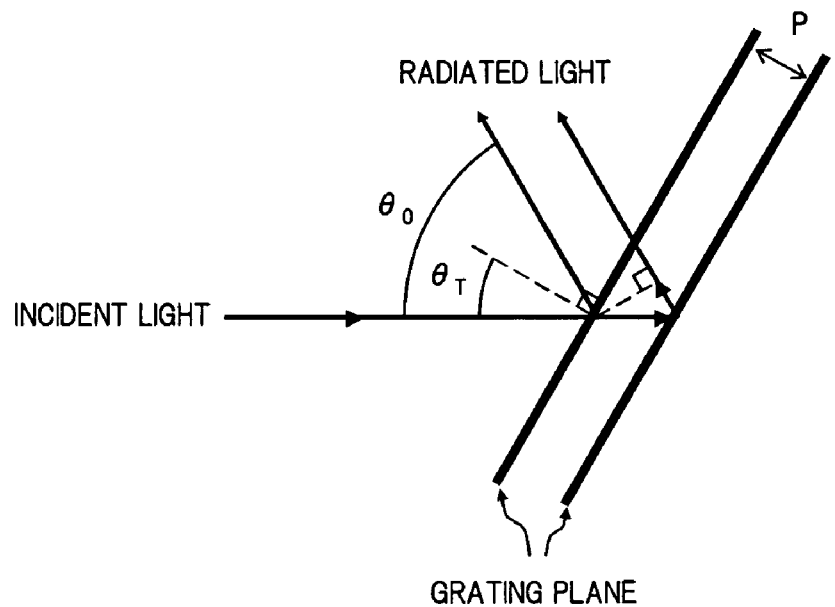
FIG. 7 is a diagram for explaining a radiation angle of a reflected light and a tilting angle of a grating plane in a tilted FBG.

Further, there has been known that a relationship between the reflective wavelength $\lambda_B'$ of the tilted FBG, and a radiation angle $\theta_0$ of the reflected light and a tilting angle $\theta_T$ of the grating plane as shown in FIG. 7, is represented by the next equation (5) (refer to the literature 1 described above).

$$\lambda_B' = \lambda_B(1 + \cos\theta_0)/2\cos\theta_T \qquad (5)$$

According to a relationship between the equation (4) and the equation (5), it is understood that the radiation angle $\theta_0$ of the reflected light is determined according to the reflective wavelength $\lambda_B'$ and the grating pitch P. In the case where the reflective wavelength $\lambda_B'$ is fixed, the radiation angle $\theta_0$ has a large value when the grating pitch P is long.

Further, there has been known that the grating pitch P is gradually changed to the longitudinal direction of the optical fiber to make the tilted FBG a chirped configuration, so that the reflected light is collected on a different position for each wavelength (refer to U.S. Pat. No. 5,061,032). Namely, in the tilted and chirped FBG, by performing appropriately the chirp designing, a reflected light of desired wavelength can be collected on a predetermined position along the longitudinal direction of the optical fiber. Therefore, in the GEQ 8 in the present embodiment, by utilizing the above characteristic of the tilted and chirped FBG, lights corresponding to the noise light in the wavelength range $\Delta\lambda_N$ and the respective signal light wavelengths are collected on different positions outside the core of the optical fiber F.

Figure 8:
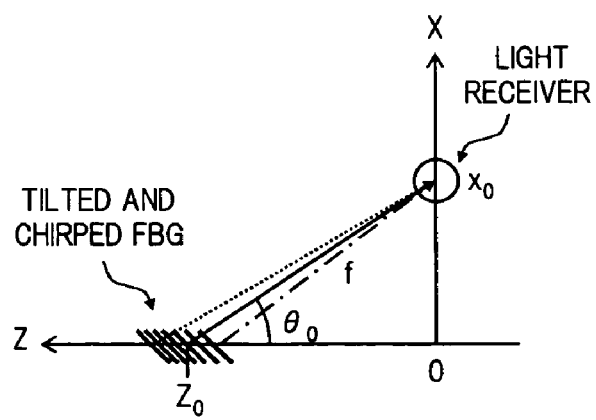
FIG. 8 is a diagram for explaining a collecting position of a reflected light in a tilted and chirped FBG.

As shown in FIG. 8, there has been known that a reflective wavelength $\lambda_B(z)$ in the vacuum of the tilted and chirped FBG is represented by the next equation (6) provided that the grating pitch in a position z is P(z), in the case where the longitudinal direction of the optical fiber on which the tilted and chirped FBG is formed is the Z-axis (refer to the above described literature 1).

$$\lambda_B(z) = n\{P(z)/\cos\theta_T\}(1+\cos\theta_0) \qquad (6)$$

Further, the above reflective wavelength $\lambda_B(z)$ can be represented by the next equation (6)' provided that a chirp amount of the tilted and chirped FBG (a change amount of the grating pitch per unit length with respect to the longitudinal direction of the optical fiber) is c(z), and a wavelength of the light reflected from a center position $Z_0$ of the tilted and chirped FBG is $\lambda_{B0}$.

$$\lambda_B(z) = \lambda_{B0} + c(z)(z-z_0) \qquad (6)'$$

A collecting position $x_0$ and a focal distance f of the light of this reflective wavelength $\lambda_B(z)$ in an X-axis direction (a direction perpendicular to the longitudinal direction of the optical fiber) can be represented by the next equations (7) and (8).

$$x_0 = \{z \cdot \tan[\theta_0(z)]\}|_{z=z_0} \qquad (7)$$

$$f = z_0/\cos\theta_0 \qquad (8)$$

By setting designing parameters (the grating pitch P(z), the effective refractive index n, the refractive index modulation amount $\Delta n$, the tilting angle $\theta_T$ of the grating plane, the chirp amount c(z) and the like) of the tilted and chirped FBG as described in the above, it becomes possible to form an optical demultiplexing system for reflecting the noise light in the wavelength range $\Delta\lambda_N$ outside the signal band and the light corresponding to each signal light wavelength to the outside of the core of the optical fiber F, while being provided with the function as the GEQ (the transmission wavelength characteristic capable of flattening the gain wavelength characteristic of the optical amplifying circuit 1 in the signal band $\Delta\lambda_S$).

To be specific, in order to realize the desired transmission wavelength characteristic in the signal band $\Delta\lambda_S$, it is possible to adjust the refractive index modulation amount $\Delta n$, thereby achieving the optimization of the transmittance to each wavelength (refer to a literature 4: "Gain Equalizer Using Slanted Fiber Bragg Gratings" by A. Niwa et al., Fujikura Technical Report, October 2002).

Then, in order to prevent the primary gain equalization function of the GEQ from being deteriorated, the wavelength $\lambda_B(z)$ of the light to be reflected by the tilted and chirped FBG, and the radiation angle $\theta_0$ and focal distance f of the reflected light are optimized, using the designing parameters other than the refractive index modulation amount $\Delta n$, so that the arrangement of each of the light receivers $3_N$, $3_1$ to $3_M$ is determined according to the position on which the reflected light in the desired wavelength band is collected.

As a manufacturing method of the tilted and chirped FBG designed in the above manner, it is preferable to control an irradiation time and a light amount of the ultraviolet light in each position in a longitudinal direction of the FBG, thereby changing the reflectance (transmittance) to the light of each wavelength. For example, in the case where the reflectance is made to be higher, in a predetermined position on the longitudinal direction of the FBG, on which the light in an objective wavelength band is reflected, the ultraviolet light irradiation time and the ultraviolet light amount at the time of forming the FBG are increased, thereby increasing the refractive index modulation amount $\Delta n$.

It has been known that the focal distance f of the reflected light in the tilted and chirped FBG is changed depending on the effective refractive index n, the chirp amount c(z), the tilting angle $\theta_T$ of the grating plane and the refractive index modulation amount $\Delta n$ (refer to the above described literature 2). To shorten the focal distance f is equivalent to the arrangement of the light receiver in the vicinity of the tilted and chirped FBG while maintaining the high wavelength resolution, and therefore, is effective in improving the monitoring accuracy and miniaturizing the optical amplifier. Also in the case where the focal distance f is made to be shorter, in order to prevent the primary gain equalization function of the GEQ from being deteriorated, it is preferable to use the designing parameters other than the refractive index modulation amount $\Delta n$. The chirp amount c(z) is preferably selected to be made larger, thereby enabling the shortening of the focal distance f without a substantial influence on the function as the GEQ. For example, in the case where the focal distance of about 18 cm is necessary to obtain 0.1 nm as the wavelength resolution, it is obtained by the calculation that the focal distance can be reduced to 9 cm the half of 18 cm by reducing the chirp amount from 547 nm/cm to 273 nm/cm. Note, such an example does not mean that the designing parameter selected for shortening the focal distance f is limited to the chirp amount c(z).

In the above described example, it is basically considered that the light receiver is arranged corresponding to the focal distance of the reflected light. However, contrary to the above, it is also possible to design such that the light receiver is arranged on a position shorter than the focal distance to make the wavelength resolution of the monitor rough in an allowable range, thereby achieving the miniaturization of the optical amplifier and the low cost by the reduction of the number of light receivers. To be specific, the light receiver is brought closer to a position where the desired wavelength resolution can be obtained, than the focal distance f of the reflected light of each wavelength, which is determined with the designing parameters of the tilted and chirped FBG, to make daringly the wavelength resolution rough, thereby achieving the miniaturization of the optical amplifier and the reduction of the number of light receivers. Thus, it is possible to arbitrarily design the wavelength resolution of the monitor, and the arrangement and number of the light receivers, according to the required performance of the optical amplifier. Further, as an application example for simplifying the assembly of the light receiving section, it is also effective to determine the arrangement so that the plurality of light receivers corresponding to the respective wavelength bands are arrayed in a straight line, to use the arrayed light receivers (PD array). By applying such a configuration, it becomes possible to realize the optical amplifier of further low cost and simple configuration.

Figure 9:
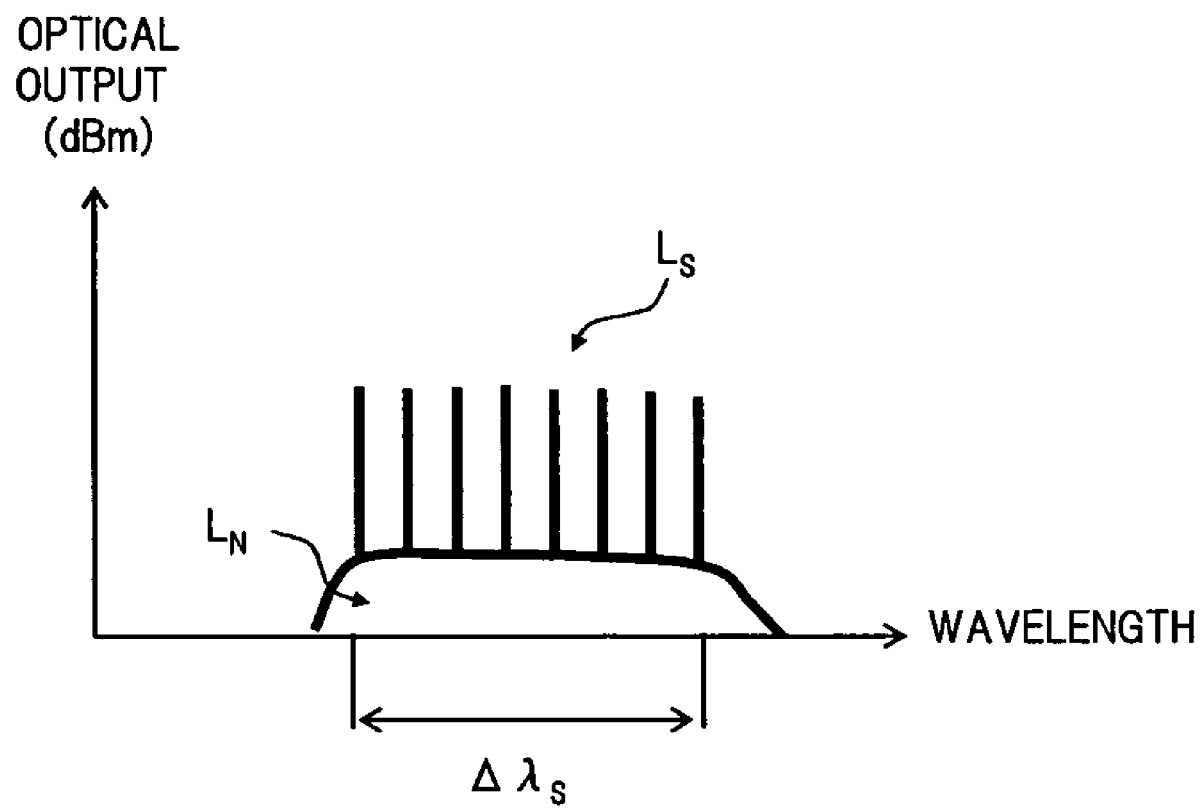
FIG. 9 is a diagram showing a wavelength characteristic of an output light in the second embodiment.

According to the second embodiment in which the designing of the GEQ 8 using the tilted and chirped FBG is performed, it is possible to realize the monitor system of simple optical circuit configuration, using the GEQ provided in the typical WDM optical amplifier, without the necessity of inserting the monitoring optical branching device or the like on the optical fiber F through which the main signal light is propagated. Thus, it becomes possible to monitor with high accuracy the total power of the noise light $L_N$ generated in the optical amplifying circuit 1, and also it becomes possible to monitor the wavelength characteristic of the output power of the light corresponding to each signal light wavelength. By controlling the optical amplifying circuit 1 using these monitoring results, it is possible to stably obtain the optical output $L_{OUT}$ having the flat wavelength characteristic in which the signal light power of each wavelength is uniformed at a desired level as shown in FIG. 9 for example. Further, since the monitor system utilizing the above GEQ is basically equivalent to the one in which the reflective characteristic is added to the outside of the signal band in the typical GEQ, the primary gain equalization function of the GEQ is not deteriorated. Further, since the reflectance of the GEQ 8 to the wavelength range $\Delta\lambda_N$ outside the signal band does not depend on the reflectance in the signal band $\Delta\lambda_S$ and accordingly, can be arbitrarily set according to the performance or the like of the light receiver $3_N$, it becomes possible to receive the noise light of large power to monitor the noise light with excellent accuracy, compared with the monitor system using the conventional optical branching device. In addition, the wavelength resolution of the monitor can be changed according to the arrangement of the respective light receivers $3_N$, and $3_1$ to $3_M$ to the GEQ 8, and therefore, the flexibility can be achieved in which a monitoring function sufficient to the required performance can be realized.

In the optical amplifier in the second embodiment, as well as in the first embodiment, it is surely possible to transmit the total power of the noise light $L_N$ monitored by the upstream side optical amplifier to the downstream side optical amplifier, to perform the noise light correction in the no-signal light input detection in the downstream side optical amplifier, and also to perform the control for avoiding the oscillating operation of the optical amplifier utilizing the noise light power monitored by the light receiver.

Note, in the second embodiment, the description has been made on the case where the GEQ 8 is configured by using the tilted and chirped FBG. However, the present invention is not limited thereto, and it is also possible to form the tilted and chirped diffraction grating utilizing a photonic crystal disclosed in a literature 5: "Optical devices with wavelength-selectivity using multi-dimensional periodic structure" by Osamu Hanaizumi et al., For limit utilization of wavelength integration-operating photonics-optical spectrum resource—symposium 2003, lectures p. 85 to 88, Jan. 21 to 22, 2004, instead of the FBG.

Further, in the second embodiment, the function as the optical reflection medium is added to the GEQ provided in the typical WDM optical amplifier, to monitor the noise light power and the like. However, in the optical amplifier which amplifies a signal light of single wavelength for example, the tilted FBG may be applied to the optical filter for rejecting the noise light, which is disposed instead of the GEQ, thereby adding the function as the optical reflection medium.

Moreover, in the second embodiment, the common GEQ 8 monitors the noise light existing in the predetermined wavelength range $\Delta\lambda_N$ outside the signal band simultaneously with the wavelength characteristic of the output light corresponding to each signal light wavelength. However, the present invention is effective, even in the case where the tilted and chirped FBG from which the monitoring function of the noise light is omitted, is applied to the typical GEQ. In such a case, it is possible to monitor the wavelength characteristic of output light with a simple optical circuit configuration, compared with the output light monitor system using the conventional optical branching device and the like.

In addition, in the second embodiment, the constitutional example has been shown in which the light reflected to be radiated to the outside of the core of the optical fiber F by the GEQ 8 is directly received by each of the light receivers $3_N$, and $3_1$ to $3_M$. However, the constitution may be such that a lens medium (as specific examples, a ball lens, an aspherical lens, a cylindrical lens or a prism, or a combination of these lenses, or the like) is disposed between the GEQ 8 and each of the light receivers $3_N$, and $3_1$ to $3_M$, to improve the collecting property of the reflected light reached at each of the light receivers $3_N$, and $3_1$ to $3_M$. Further, if the wavelength resolution of the monitor is within the allowable range, it is possible to suppress the attenuation of the reflected light even in the case where each light receiver is arranged closer to an outer surface of the clad of the optical fiber F on which the GEQ 8 is formed.

Next, a third embodiment of the present invention will be described.

Figure 10:
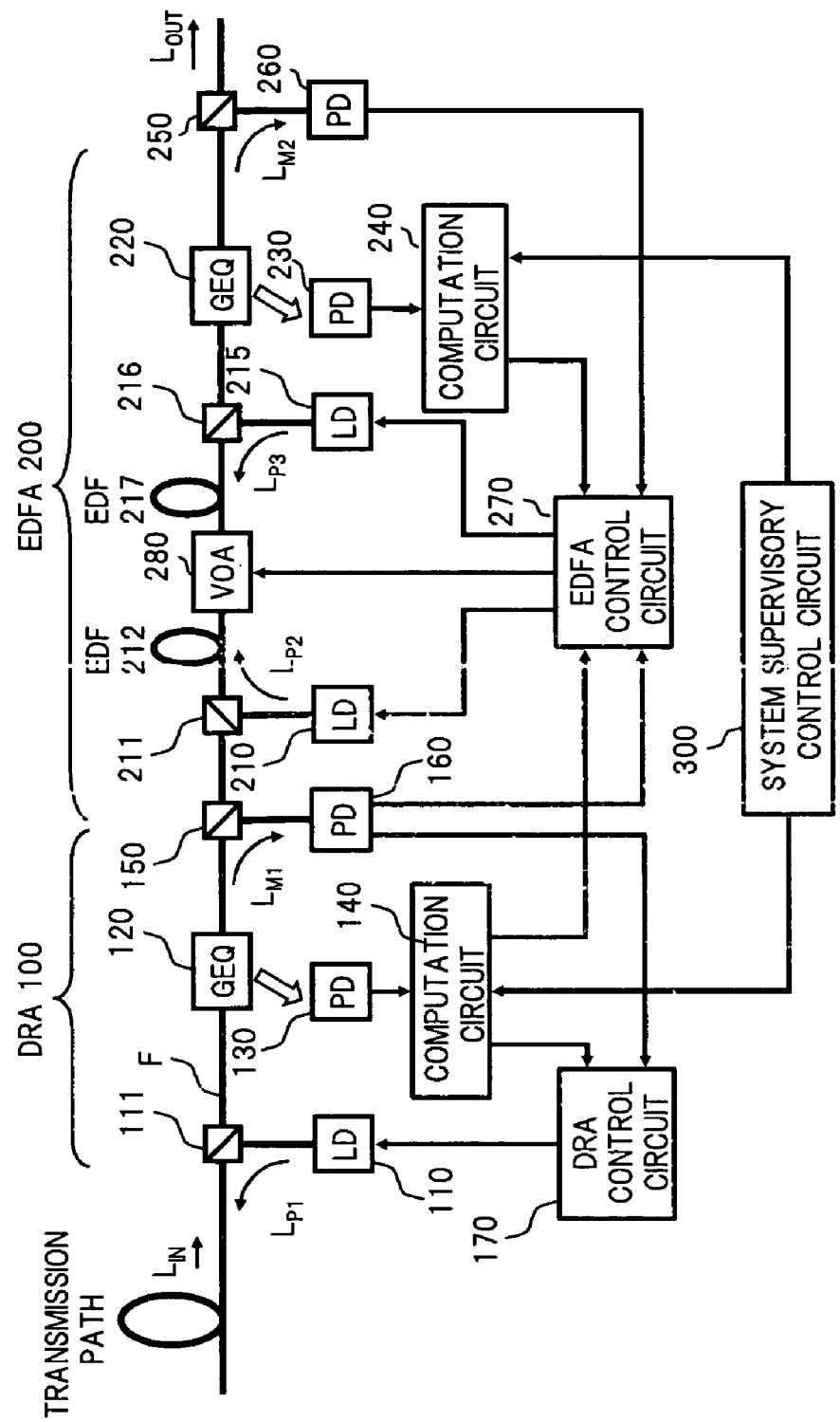
FIG. 10 is a block diagram showing a configuration of an optical amplifier according to a third embodiment of the present invention.

FIG. 10 is a block diagram showing a configuration of an optical amplifier in the second embodiment.

In FIG. 10, the optical amplifier in the third embodiment is a specific example in the case where the present invention is applied to a configuration in which a distributed Raman amplifier (DRA) 100 and an erbium doped optical fiber amplifier (EDFA) 200 are connected in cascade.

The DRA 100 on the former stage supplies a Raman amplification pumping light $L_{P1}$ generated in a pumping light source (LD) 110 to an input side transmission path (optical amplification medium) via an optical multiplexer 111, to amplify a signal light being propagated through the transmission path due to a Raman effect. A noise light is generated with the Raman amplification of the signal light in the transmission path, and this noise light passes through the optical multiplexer 111 together with the Raman amplified signal light, to be input to a DRA gain equalizer (GEQ) 120. Note, herein, one example of the distributed Raman amplifier is shown in which the transmission path is the optical amplification medium. However, the present invention is not limited thereto, and it is also possible to use a DCFRA or the like in which for example a dispersion compensating fiber (DCF) or the like is made to be the optical amplification medium, and the pumping light is injected to the DCF to Raman amplify the signal light.

As well as the GEQ 8 in the above described second embodiment, the DRA GEQ 120 has the function of reflecting the noise light existing in the predetermined wavelength range outside the signal band and the light corresponding to each signal light wavelength to radiate the reflected lights to the outside of the core of the optical fiber F, in addition to a function of flattening a gain wavelength characteristic of Raman amplification in the transmission path. The light of each wavelength reflected to be radiated to the outside of the core of the optical fiber F by the DRA GEQ 120 is received by a light receiver (PD) 130 where the power thereof is measured. The total power of the noise light generated due to the Raman amplification and a wavelength characteristic of the output power of the Raman amplified signal light of each wavelength are computed in a computation circuit 140, based on the measurement result. The computation results in the computation circuit 140 are transmitted to a DRA control circuit 170 which controls the pumping light source 110, and also to an EDFA control circuit 270 on the latter stage. Further, a part of the light which passes through the DRA GEQ 120 to be input to the EDFA 200 on the latter stage, is branched by an optical branching device 150 as a monitor light $L_{M1}$, and the power of the monitor light $L_{M1}$ is measured by a light receiver (PD) 160. The measurement result in the light receiver 160 is transmitted to the DRA control circuit 170 and also to the EDFA control circuit 270.

The EDFA 200 is of a two-staged configuration consisting of an EDF 212 on the former stage to which a pumping light $L_{P2}$ generated in a pumping light source (LD) 210 is supplied via an optical multiplexer 211 and an EDF 217 on the latter stage to which a pumping light $L_{P3}$ generated in a pumping light source (LD) 215 is supplied via an optical multiplexer 216, and is provided with, between the EDF 212 and the EDF 217, a variable optical attenuator (VOA) 280 for controlling an output level, and also an EDFA GEQ 220 and an optical branching device 250 are disposed on the optical fiber F on the latter stage of the optical amplifier 216. As well as the GEQ 8 in the above described second embodiment, the EDFA GEQ 220 has the function of reflecting the noise light existing in the predetermined wavelength range outside the signal band and the light corresponding to each signal light wavelength to radiate the reflected lights to the outside of the core of the optical fiber F, in addition to a function of flattening a gain wavelength characteristic in the entirety of the EDF 212 and EDF 217. The light of each wavelength reflected to be radiated to the outside of the core of the optical fiber F by the EDFA GEQ 220 is received by a light receiver (PD) 230 where the power thereof is measured. The total power of the noise lights generated in the respective EDF 212 and EDF 217, and the wavelength characteristic of the output power of the signal light of each wavelength amplified in each of the EDF 212 and the EDF 217, are computed in a computation circuit 240. The computation results in the computation circuit 240 are transmitted to the EDFA control circuit 270. Further, a part of the light passed through the EDFA GEQ 220 is branched by the optical branching device 250 as a monitor light $L_{M2}$, and the power of the monitor light $L_{M2}$ is measured by a light receiver (PD) 260. The measurement result in the light receiver 260 is transmitted to the EDFA control circuit 270. The EDFA control circuit 270 controls the respective pumping light sources 210 and 215, and the variable optical attenuator 280, based on output signals from the computation circuit 240, and the light receivers 160 and 260. Note, a system supervisory control circuit 300 in the figure is for giving signal light information relating to the number, the allocation and the like, of wavelengths of the signal lights contained in the WDM light to be amplified in the present optical amplifier, to the respective computation circuits 140 and 240 in the DRA 100 and the EDFA 200. The signal light information from this system supervisory control circuit 300 is referred to, when the noise light correction is performed in each of the computation circuits 140 and 240, for example, so as to avoid the deterioration of the monitoring accuracy due to a change in an operating situation (number of signals, signal band and the like) of the optical communication system to which the present optical amplifier is applied.

In the optical amplifier having the above configuration in the present embodiment, a supply state of the Raman amplification pumping light $L_{P1}$ (for example, a ratio or the like of pumping light power of each wavelength in the case where the pumping light of a plurality of wavelengths are supplied to the transmission path,) is controlled in the DRA control circuit 170, based on a wavelength characteristic of the DRA output power in the signal band, which is monitored by the DRA GEQ 120, the light receiver 130 and the computation circuit 140, so that a gain wavelength characteristic of the DRA is optimized. As a result, the total power of the changed DRA output is controlled to a desired level, by adjusting the supply power or the like of the Raman amplification pumping light $L_{P1}$ based on the monitored values by the optical branching device 150 and the light receiver 160. Further, information relating to the total power of the noise light generated due to the Raman amplification, which is obtained in the computation circuit 140, is transmitted to the EDFA control circuit 270 from the computation circuit 140.

In the EDFA 200 on the latter stage, the total power of the noise lights generated in the EDF 212 and the EDF 217 and the wavelength characteristic of the output power in the signal band, which are monitored in the EDFA GEQ 220, the light receiver 230 and the computation circuit 240, are transmitted to the EDFA control circuit 270, and the total power of the output light $L_{OUT}$ monitored in the optical branching device 250 and the light receiver 260 is transmitted to the EDFA control circuit 270. Then, in the EDFA control circuit 270, the noise light correction is performed on the output light $L_{OUT}$ added with not only the noise lights generated in the EDF 212 and the EDF 217, but also the noise light generated in the DRA 100 on the former stage, and supply states of the pumping lights $L_{P2}$ and $L_{P3}$ are adjusted based on the correction result, so that a gain wavelength characteristic of the EDFA is controlled, and also an attenuation amount of the VOA 280 is adjusted so that an output level is controlled. Further, in the EDFA control circuit 270, the total power of the noise light transmitted from the computation circuit 140 of the DRA 100 is used so that the noise light correction is performed on a threshold for no-input detection. In the case where the monitored value of the light receiver 160 becomes less than the threshold, the no-input of the signal light is detected so that shut-down controls of the pumping light sources 210, 215 and the like are performed. Further, in the case where the EDFA 200 has a large gain coefficient, the noise light power in the wavelength range in the vicinity of a gain peak is monitored in the EDFA GEQ 220, the light receiver 230 and the computation circuit 240, to control the power of each of the pumping lights $L_{P2}$ and $L_{P3}$ so that the monitored value does not exceed an oscillation threshold to which a reference is previously set, thereby avoiding an oscillating operation of the EDFA 200.

According to the optical amplifier in the third embodiment as described above, it is possible to monitor high accurately, with a simple optical circuit configuration, the noise lights generated in the DRA 100 and the EDFA 200, and the wavelength characteristic of the output power of each of the DRA 100 and the EDFA 200. Therefore, by performing various controls of the DRA 100 and the EDFA 200 based on the monitored results, it becomes possible to stably obtain the signal light output of flat wavelength characteristic, which is controlled to a desired output level, and at the same time, it becomes possible to perform the shutdown control reliably without an influence of the noise light.

Note, in the third embodiment, the constitutional example has been shown in which the DRA 100 and the EDFA 200 are connected in cascade. However, the configuration of the optical amplifier according to the present invention is not limited to the above example, and it is possible to apply the monitoring technology of the present invention to an optical amplifier of know configuration.

Figure 11:
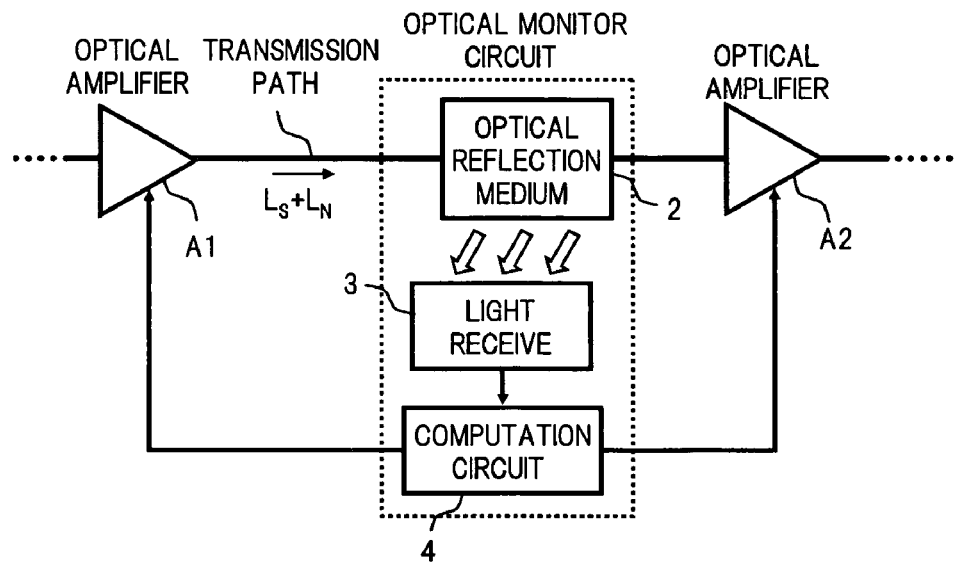
FIG. 11 is a block diagram showing one example of an optical monitor circuit to which the present invention is applied.

Further, in the first to third embodiments, the configuration has been such that the optical reflection medium or the optical filter such as GEQ or the like to which the function as the optical reflection medium is added, is disposed to the inside of the optical amplifier. However, the present invention is not limited thereto, and as shown in FIG. 11 for example, the configuration may be such that the optical reflection medium 2 is disposed on the transmission path which connects between an upstream optical amplifier A1 and a downstream optical amplifier A2, and the light receiver 3 and the computation circuit 4 are disposed in the vicinity of the optical reflection medium 2, to configure an optical monitor circuit, thereby monitoring the power of the noise light $L_N$ generated in the upstream optical amplifier A1, the wavelength characteristic of the signal light output and the like. In such an optical monitor circuit, it is also possible to achieve an effect same as that in each of the embodiments described above.

What is claimed is:

1. An optical amplifier comprising:
an optical amplification section that amplifies a signal light;
an optical reflection medium which is disposed on an optical fiber connected to said optical amplification section and is capable of reflecting a noise light which exists in a predetermined wavelength range outside a signal band, among noise lights generated in said optical amplification section, to radiate the reflected noise light to the outside of a core of said optical fiber;
a light receiving section that receives the noise light reflected to be radiated to the outside of the core of said optical fiber by said optical reflection medium, to detect the power of the noise light; and
a computation section that computes a total power of the noise lights generated in said optical amplification section based on the detection result of said light receiving section,
wherein when said optical amplifier includes an optical filter device which transmits the signal light in accordance with a previously set transmission wavelength characteristic, on the optical fiber connected to said optical amplification section, said optical filter device is provided with a function as said optical reflection medium,
said optical amplification section amplifies a wavelength division multiplexed light containing a plurality of signal lights of different wavelengths, and
said optical filter device is a gain equalization optical filter having a transmission wavelength characteristic capable of flattening a gain wavelength characteristic of said optical amplification section in a signal band of said wavelength division multiplexed light, and also a reflection characteristic capable of reflecting the noise light existing in the predetermined wavelength range outside the signal band to radiate the reflected noise light to the outside of the core of said optical fiber.

2. An optical amplifier according to claim 1,
wherein said gain equalization optical filter has a reflection characteristic capable of reflecting a light corresponding to a wavelength of said each signal light to radiate the reflected light to the outside of the core of said optical fiber,
said light receiving section includes a first light receiver which receives the noise light reflected to be radiated to the outside of the core of said optical fiber by said gain equalization optical filter, to detect the power of the noise light, and a second light receiver which receives the light corresponding to the wavelength of said each signal light reflected to be radiated to the outside of the core of said optical fiber by said gain equalization optical filter, to detect the power of the light, and
said computation section computes the total power of the noise lights generated in said optical amplifying section based on the detection result in said first light receiver, and also judges a wavelength characteristic of the optical power in the signal band based on the detection result in said second light receiver.

3. An optical amplifier comprising:
an optical amplification section that amplifies a signal light;
an optical reflection medium which is disposed on an optical fiber connected to said optical amplification section and is capable of reflecting a noise light which exists in a predetermined wavelength range outside a signal band, among noise lights generated in said optical amplification section, to radiate the reflected noise light to the outside of a core of said optical fiber;
a light receiving section that receives the noise light reflected to be radiated to the outside of the core of said optical fiber by said optical reflection medium, to detect the power of the noise light; and
a computation section that computes the total power of the noise lights generated in said optical amplification section based on the detection result of said light receiving section,
wherein when said optical amplifier includes an optical filter device which transmits the signal light in accordance with a previously set transmission wavelength characteristic, on the optical fiber connected to said optical amplification section, said optical filter device is provided with a function as said optical reflection medium,
said optical amplification section amplifies a signal light of a single wavelength, and
said optical filter device is an optical filter for rejecting the noise light which has a transmission band whose center is a wavelength of said signal light, and has a reflection characteristic capable of reflecting a noise light existing in a predetermined wavelength range outside said transmission band to radiate the reflected noise light to the outside of the core of said optical fiber.

4. An optical amplifier according to claim 1,
wherein said optical reflection medium includes a diffraction grating in which a normal direction of a grating plane is arranged to be tilted to an axial direction of said optical fiber, and reflects a part of a light propagated through said optical fiber to radiate the reflected light to the outside of the core of said optical fiber.

5. An optical amplifier according to claim 4,
wherein said optical reflection medium includes a tilted fiber grating in which a Bragg diffraction grating is formed to be tilted to the axial direction of said optical fiber.

6. An optical amplifier according to claim 5,
wherein said optical reflection medium includes a tilted and chirped fiber grating in which grating spacing of said Bragg diffraction grating is gradually changed along the axial direction of said optical fiber.

7. An optical amplifier according to claim 6,
wherein said light receiving section is arranged on a position according to a focal distance of the light reflected to be radiated to the outside of the core of said optical fiber by said optical reflection medium.

8. An optical amplifier according to claim 6,
wherein said light receiving section is arranged on a position closer to said optical reflection medium side than the focal point of the light reflected to be radiated to the outside of the core of said optical fiber by said optical reflection medium.

9. An optical amplifier according to claim 4,
wherein said optical reflection medium is configured by arranging a photonic crystal on said optical fiber to form said diffraction grating.

10. An optical amplifier according to claim 1,
wherein there is provided a control section that corrects the noise light power contained in the optical output power from said optical amplification section based on the total power of the noise lights computed in said computation section to calculate the optical output power of only a signal light component, thereby controlling said optical amplification section according to the calculation result.

11. An optical amplifier according to claim 1,
wherein the total power of the noise lights computed in said computation section is transmitted to a downstream side optical amplifier, and in said downstream side optical amplifier, no-input of the signal light is detected, based on the optical power of only the signal light which is calculated by subtracting the noise light power generated in an upstream side optical amplifier from the total output light power.

12. An optical amplifier according to claim 1,
wherein said optical reflection medium is capable of reflecting a noise light in the vicinity of a gain peak wavelength of said optical amplifying section to radiate the reflected noise light to the outside of the core of said optical fiber, and
there is provided a control section that controls said optical amplifying section so that the noise light power in the vicinity of said gain peak wavelength, which is detected by said light receiving section, becomes less than a previously set oscillation threshold.

13. An optical amplifier according to claim 1,
wherein said optical amplifying section includes a rare-earth element doped fiber amplifier.

14. An optical amplifier according to claim 1,
wherein said optical amplifying section includes a Raman amplifier which injects a pumping light to an optical amplification medium to Raman amplify the signal light.

15. An optical amplifier according to claim 1,
wherein said optical amplifying section includes a semiconductor optical amplifier.

16. An optical monitor circuit comprising:
an optical reflection medium formed on an optical fiber through which a plurality of lights of different wavelengths is propagated, including a diffraction grating in which a normal direction of a grating plane is arranged to be tilted to an axial direction of said optical fiber and a reflection characteristic thereof is designed so that the reflectance to the light in a first wavelength band and the reflectance to the light in a second wavelength band different from said first wavelength band are different from each other, among the lights propagated through said optical fiber, and being capable of radiating the reflected lights to the outside of the core of said optical fiber;
a first light receiving section that receives the light in said first wavelength band reflected to be radiated to the outside of the core of said optical fiber by said optical reflection medium, to detect the power of the radiated light; and
a second light receiving section that receives the light in said second wavelength band reflected to be radiated to the outside of the core of said optical fiber by said optical reflection medium, to detect the power of the radiated light,
wherein said optical reflection medium includes a tilted and chirped fiber grating in which a Bragg diffraction grating is formed to be tilted to the axial direction of said optical fiber and grating spacing of said Bragg diffraction grating is gradually changed along the axial direction of said optical fiber, and
said first and second light receiving sections are arranged on positions according to a focal distance of the light reflected to be radiated to the outside of the core of said optical fiber by said tilted and chirped fiber grating, so that said optical monitor is configured to chance a wavelength resolution according to the arrangement of said first and second light receiving sections.

17. An optical monitor circuit according to claim 16,
wherein the lights propagated through said optical fiber contain a signal light in said first wavelength band, and only a noise light exists in said second wavelength band, and
in said optical reflection medium, the reflection characteristic of said tilted and chirped fiber grating is designed so that the reflectance to the noise light in said second wavelength band is higher than the reflectance to the light in said first wavelength band.

* * * * *

UNITED STATES PATENT AND TRADEMARK OFFICE
CERTIFICATE OF CORRECTION

PATENT NO. : 7,688,498 B2
APPLICATION NO. : 10/998064
DATED : March 30, 2010
INVENTOR(S) : Miki Onaka et al.

It is certified that error appears in the above-identified patent and that said Letters Patent is hereby corrected as shown below:

Claim 16, Col. 20, line 28, delete "chance" and add -- change --.

Signed and Sealed this

Eighth Day of June, 2010

David J. Kappos
*Director of the United States Patent and Trademark Office*